United States Patent
Zhang

(10) Patent No.: US 9,735,961 B2
(45) Date of Patent: Aug. 15, 2017

(54) MANAGING KEY ROTATIONS WITH MULTIPLE KEY MANAGERS

(71) Applicant: Verizon Patent and Licensing, Inc., Arlington, VA (US)

(72) Inventor: Fengping Zhang, Burlington, MA (US)

(73) Assignee: VERIZON PATENT AND LICENSING INC., Basking Ridge, NJ (US)

(*) Notice: Subject to any disclaimer, the term of this patent is extended or adjusted under 35 U.S.C. 154(b) by 95 days.

(21) Appl. No.: 14/942,091

(22) Filed: Nov. 16, 2015

(65) Prior Publication Data

US 2017/0141916 A1    May 18, 2017

(51) Int. Cl.
*H04L 9/08*    (2006.01)

(52) U.S. Cl.
CPC .......... *H04L 9/0891* (2013.01); *H04L 9/0861* (2013.01); *H04L 9/0894* (2013.01)

(58) Field of Classification Search
CPC .... H04L 9/0891; H04L 9/0861; H04L 9/0894
See application file for complete search history.

(56) References Cited

U.S. PATENT DOCUMENTS 8,842,841 B2 * 9/2014 Hook ................. H04L 9/14
380/277

* cited by examiner

*Primary Examiner* — Oleg Korsak

(57) ABSTRACT

A method, a device, and a non-transitory storage medium are provided to generate and transmit a request to obtain a resource object stored in a clustered network database that stores keys; determine based on a value of the resource object carried in a response, whether permission to update the keys is permitted, wherein a first value of the resource object grants permission and a second value of the resource object does not grant permission; determine whether any of the keys expired in response to receiving permission, wherein other network devices configured to update the keys are prevented from updating the keys while the network device is granted permission; generate a new key for each key of the keys that expired; and store the new key for each key; and release the resource object back to the clustered network database.

20 Claims, 15 Drawing Sheets

MANAGING KEY ROTATIONS WITH MULTIPLE KEY MANAGERS

BACKGROUND

Digital signature-based authentication can be used during the provisioning of various Internet services. For example, a toll free data service (TFDS) provides that an entity (e.g., a mobile network operator (MNO), a mobile virtual network operator (MVNO), an Internet Service Provider (ISP), a content provider, etc.) does not charge an end user for data consumed when using an application, an Internet service, content, and so forth. The entity may obtain keys from a key management system for use in providing digital signature-based authentication.

DETAILED DESCRIPTION OF PREFERRED EMBODIMENTS

Figure 1:
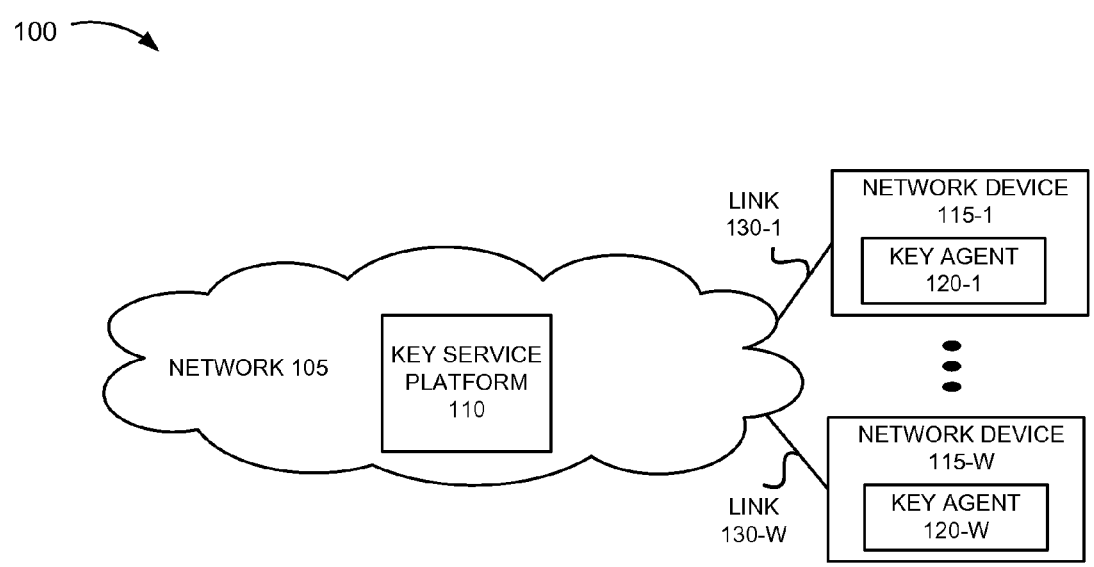
FIG. 1 is a diagram illustrating an exemplary environment in which an exemplary embodiment of a key service platform may be implemented.

The following detailed description refers to the accompanying drawings. The same reference numbers in different drawings may identify the same or similar elements. Also, the following detailed description does not limit the invention.

Various Internet services, such as e-commerce, social media sites, media streaming, TFDS, etc., may include or use various sub-services, such as a digital signature-based authentication service. According to an exemplary implementation, a key manager is responsible for providing various key services, such as managing key generation, key storage, key distribution, and key rotation. The key manager may provide a key service to a key agent or a key client of a network device via a Representational State Transfer (Rest)ful application programming interface (API). For example, the network device may be an authentication and/or authorization server or another type of server that provides a service to end users. By way of further example, with respect to a TFDS, the key agent uses keys (e.g., private keys) to authorize and authenticate sponsored data uniform resource identifiers (URIs). For example, the key agent may use the keys to generate digital signatures for authorizing sponsored data network resources via particular URIs.

Typically, the key manager auto-generates new keys according to a pre-defined time policy and in support of a key rotation mechanism. The key manager uses a randomizing algorithm to generate a key identifier and key a value. For example, the key manager may use a random number generator or other well-known algorithms (e.g., RC4, Blum Blum Shub, Wichman-Hill, etc.). Each key manager operates independently in an environment, such as a data center environment or a cloud environment. The environment includes a load balancer for managing the provisioning of key services. According to this architecture, there is no guarantee that the key agent will retrieve a key, via the load balancer, from the same key manager. In support of fail-over and load balancing issues, multiple key managers and key store databases are used in conjunction with the load balancer. However, despite these efforts, there is a possibility that multiple keys are generated at the same time, which results in a key agent having different new keys.

According to an exemplary embodiment, a key service provides key generation, key storage, key distribution, and key rotation. According to an exemplary embodiment, the key service allows only one of the key managers to generate a new key at one time with respect to a key store database. According to an exemplary implementation, a resource object is used to govern the generation of keys. The resource object is accessible to all of the key managers. However, according to an exemplary embodiment, only one key manager can obtain the resource object at one time. The key manager that obtains the resource object has permission to generate a new key, if needed, pertaining to a key stored in that key store database. During this time, the remaining key managers are unable to obtain the resource object and consequently are prevented from generating a new key pertaining to keys stored in that key store database.

According to an exemplary embodiment, the key service uses a cluster network database to store all keys in synchronization across multiple key store databases. When the new key is stored in one key store database, the new key is available to other key store databases. For example, the key service ensures that multiple key store databases are always synchronized.

According to an exemplary embodiment, the key manager releases the resource object after the new key is stored in one of the key store databases. Since the key service uses a cluster database that is continuously synchronized, the key service provides that different key managers can service the same key agent or key client and return the same key when a request for a key is received. In this regard, the key service prevents a race condition across multiple key managers. According to an exemplary embodiment, the key service uses Restful APIs so that key agents or key clients can obtain keys from the key managers via a load balancer.

FIG. 1 is a diagram illustrating an exemplary environment 100 in which an exemplary embodiment of a key service platform may be implemented. As illustrated, environment 100 includes a network 105. Network 105 includes a key service platform 110. Environment 100 further includes network devices 115-1 through 115-W, in which W>1 (also referred to collectively as network devices 115 and, individually and generically as network device 115). As further illustrated, network devices 115 include key agents 120-1 through 120-W (also referred to collectively as key agents 120 and, individually and generically as key agent 120). Environment 100 may be implemented to include wireless and/or wired (e.g., electrical, optical, etc.) links. For example, links 130-1 through 130-W (also referred to collectively as links 130 and, individually and generically as link 130) provide a communication path between network devices 115 and, network 105 and key service platform 110. Links 130 may have certain characteristics, such as bandwidth capacity, transmission data rate, and the like. The arrangement and number of links 130 are exemplary. Additionally, links 130 may include an intermediary network and/or intermediary network device which is/are not illustrated in FIG. 1.

A network element may be implemented according to a centralized computing architecture, a distributed computing architecture, or a cloud computing architecture (e.g., an elastic cloud, a private cloud, a public cloud, etc.). Additionally, a network element may be implemented according to one or multiple network architectures (e.g., a client device, a server device, a peer device, a proxy device, and/or a cloud device).

The number of network elements, the number of networks, and the arrangement in environment 100 are exemplary. According to other embodiments, environment 100 may include additional network elements and/or differently arranged network elements than that illustrated in FIG. 1. Additionally, or alternatively, according to other embodiments, multiple network elements may be implemented on a single device, and conversely, a network element may be implemented on multiple devices. Additionally, or alternatively, environment 100 may include an additional network and/or arrangement of networks that is different from that illustrated in FIG. 1.

Also, according to other embodiments, one or more functions and/or processes described as being performed by a particular network element may be performed by a different network element or some combination of network elements, which may or may not include the particular network element.

Network 105 includes one or multiple networks of one or multiple types. For example, network 105 may include the Internet, the World Wide Web, an Internet Protocol (IP) Multimedia Subsystem (IMS) network, a cloud network, a wide area network (WAN), a metropolitan area network (MAN), a service provider network, a private IP network, some other type of backend network, and so forth. Depending on the implementation, network 105 may also include various network elements not illustrated, such as a gateway, a support node, a serving node, a router, a switch, a bridge, as well other network elements pertaining to various network-related functions, such as billing, security, authentication and authorization, network polices, subscriber profiles, etc.

Figure 2A:
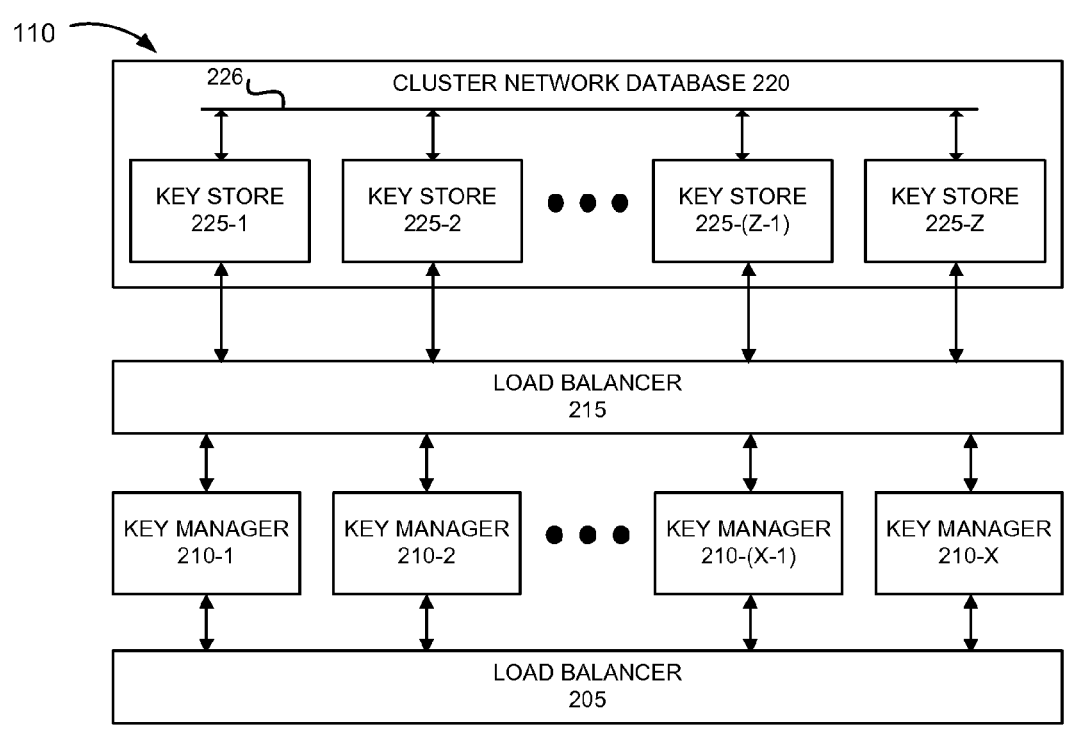
FIG. 2A is a diagram illustrating exemplary network elements of a key service platform depicted in the environment of FIG. 1.

Key service platform 110 includes a network device that provides key services, as described herein. According to an exemplary embodiment, the key services provided by key service platform 110 include key generation, key storage, key distribution, and key rotation. Key service platform 110 also provides the key services via Restful APIs that can be used by key agents 120. FIG. 2A is a diagram of exemplary network elements of key service platform 110. As illustrated, key service platform 110 includes a load balancer 205, key managers 210-1 through 210-X (also referred to collectively as key managers 210 and, individually and generically as key manager 210), a load balancer 215, and a cluster network database 220. Cluster network database 220 includes key stores 225-1 through 215-Z (also referred to collectively as key stores 225 and, individually and generically as key store 225).

According to other exemplary embodiments, key service platform 110 may include additional, fewer, and/or different network elements than those illustrated in FIG. 2A and described herein. For example, key service platform 110 may not include load balancer 205 and/or load balancer 215.

Load balancer 205 includes logic that distributes incoming traffic. For example, the incoming traffic may be requests from key agents 120 to key managers 210. Load balancer 205 may operate at various communication layers (e.g., layers 4-7 of the Open Systems Interconnection (OSI) model) and protocols (e.g. Hypertext Transfer Protocol (HTTP), HTTP Secure (HTTPS), Transport Control Protocol (TCP), Internet Protocol (IP) (v4, v6), Secure Sockets Layer (SSL), etc.). Load balancer 205 may perform various other functions, such as resource pool monitoring and rebalancing (e.g., remove downed server, etc.), HTTP caching, data compression, attack prevention (e.g., SQL injection, cross-site scripting, denial of service, etc.), data loss prevention, and so forth. Load balancer 205 may be implemented as an elastic load balancer, a virtual load balancer, and so forth.

Key manager 210 includes logic that generates a new key. According to an exemplary embodiment, key manager 210 generates a new key only when key manager 210 requests and obtains a resource object. The resource object affords key manager 210 permission to generate the new key. The resource object is accessible to each key manager 210. However, only one key manager 210 may obtain the resource object during any given time. According to an exemplary embodiment, when key manager 210 has permission, key manager 210 includes logic to determine whether a new key should be generated. For example, key manager 210 uses key expiration data, which indicates an expiration of a key, to determine whether the new key should be generated. When a new key is generated, key manager 210 includes logic that stores the new key in key store 225. According to an exemplary embodiment, key manager 210 releases the resource object after storing the new key in key store 225.

Load balancer 215 includes logic that distributes incoming traffic. For example, the incoming traffic may be requests from key managers 210 to key stores 225. Load balancer 215 may provide functions similar to those previously described in relation to load balancer 205.

Cluster network database 220 includes logic that manages key stores 225 such that each key store 225 stores keys in synchronization with other key stores 225 of a cluster. Cluster network database 220 may perform other functions, such as management of failures, redundancy, and so forth.

Key store 225 includes a database that stores keys. Each key store 225 stores a resource object. According to an exemplary implementation, each key manager 210 may be able to update any key store 225 provided key manager 210 obtains the resource object of that key store 225. Additionally or alternatively, according to another exemplary implementation, key manager 210 that updates key store 225 may be able to update any key stored in key store 225 when key manager 210 obtains the resource object of that key store 225. According to yet another exemplary implementation, key manager 210 may be responsible for updating only a portion of keys stored in key store 225. According to such an implementation, when key manager 210 obtains the resource object of key store 225, key manager 210 may be able to update only those keys for which key manager 210 is responsible. For example, key manager 210 may identify the keys for which key manager 210 is responsible (e.g., in terms of updating) based on the key identifiers of the keys and/or other attributes of the keys (e.g., key class, etc.).

Figure 2B:
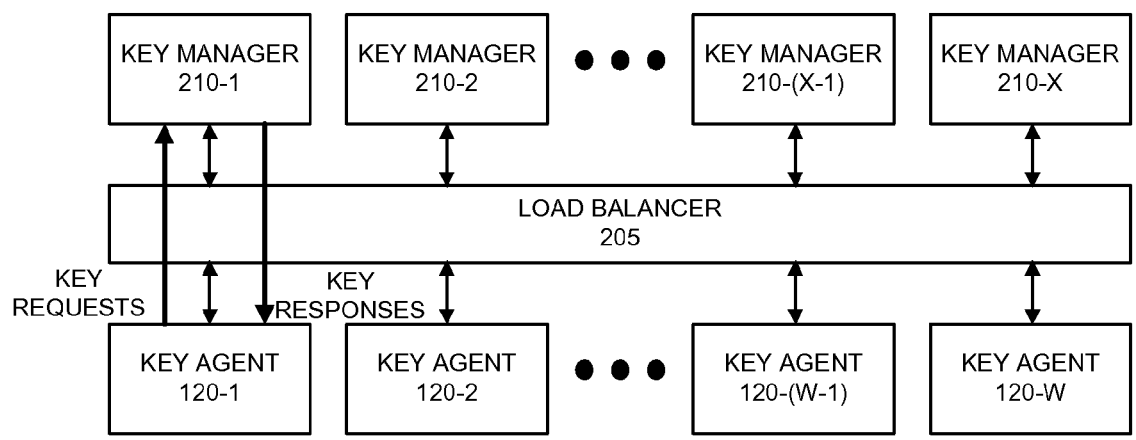
FIG. 2B is a diagram illustrating an exemplary process pertaining to a key agent requesting a key from a key manager of the key service platform.

Referring to FIG. 2B, according to an exemplary embodiment, key agents 120 can send requests for keys to key managers 210 via load balancer 205. For example, key managers 210 provide key services via a set of Restful APIs. According to an exemplary implementation, the APIs include web service technologies (e.g., Simple Object Access Protocol (SOAP), Representational State Transfer (REST), Extensible Markup Language (XML), JavaScript Object Notation (JSON), etc.). Additionally, the APIs may also use other technologies such as dynamic link libraries (DLL) files in C/C++, Java Archive (JAR) files/Remote Method Invocation (RMI) in Java, and so forth. In response to receiving the key requests, key managers 210 can retrieve keys from key stores 225 and provide the keys to key agents 120 via key responses.

Figure 3:
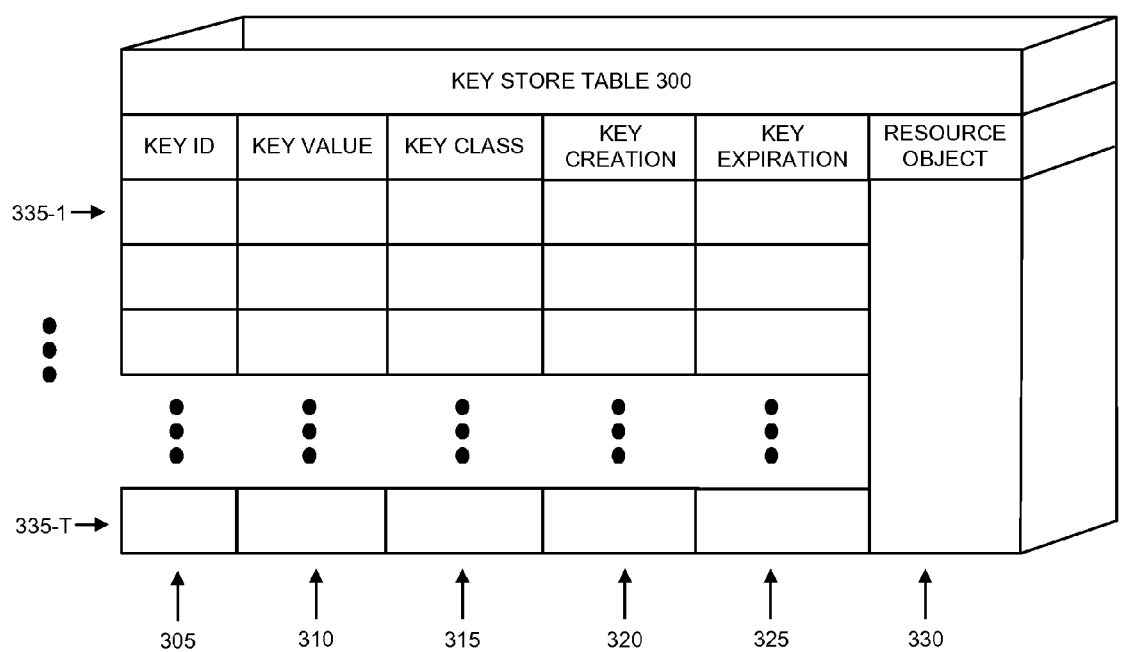
FIG. 3 is a diagram illustrating an exemplary table of a key store that stores exemplary key data.

FIG. 3 is a diagram illustrating an exemplary table of key store 225 that stores exemplary key data. As illustrated, a key store table 300 includes a key identifier field 305, a key value field 310, a key class field 315, a key creation field 320, a key expiration field 325, and a resource object field 330. According to other implementations, key store table 300 may include additional instances of data, fewer instances of data, and/or different types of data. Additionally, or alternatively, according to other implementations, key store 225 may be implemented to include a data structure different from that of a table. Key store table 300 may include profiles 335-1 through 335-T, where T>1 (also referred to as profiles 335 and, individually and/or generically as profile 335). Each profile 335 pertains to a unique key of the key service platform and key services described herein.

Key identifier field 305 stores a key identifier that uniquely identifies a key. For example, the key identifier may be implemented as a unique string of characters, numbers, a combination thereof, and so forth. Key value field 310 stores a unique value of the key.

Key class field 315 stores a class pertaining to the key. The class may indicate a use for the key. For example, a class may indicate that the key is to be used to generate a digital signature. Alternatively, another class may indicate that the key is to be used for encryption.

Key creation field 320 stores a date and timestamp value that indicates when the key is created. Key expiration field 325 stores a date and a timestamp value that indicates when the key expires. Additionally, or alternatively, key expiration field 325 stores a date and a timestamp that indicates when a new key can be generated and stored. As an example, the key may expire on Nov. 15, 2015 at 11:15:20 p.m. (Eastern time), but a key generation time policy may allow key manager 210 to generate a new key within a pre-defined time period before the expiration date and time (e.g., from Nov. 14, 2015 at 11:15:20 p.m. (Eastern time) through Nov. 15, 2015 at 11:15:20 p.m. (Eastern time)). That is, according to this example, the key generation time policy allows key manager 210 to generate a new key up to one day before the expiration of the key.

Resource object field 330 stores a resource object. The resource object affords permission to key manager 210 to generate a new key when key manager 210 obtains the resource object. According to an exemplary implementation, resource object field 330 stores a first value for the resource object and when the resource object is obtained by key manager 210, the first value in resource object field 330 changes to a new and different second value relative to the first value. Thus, when a second key manager 210 attempts to obtain the resource object from key store 225 when a first key manager 210 has obtained the resource object, the second key manager 210 is able to determine, based on the changed value, that the resource object is not available. When the first key manager 210 releases the resource object, resource object field 330 changes the value from the second value to the first value.

Figure 4A:
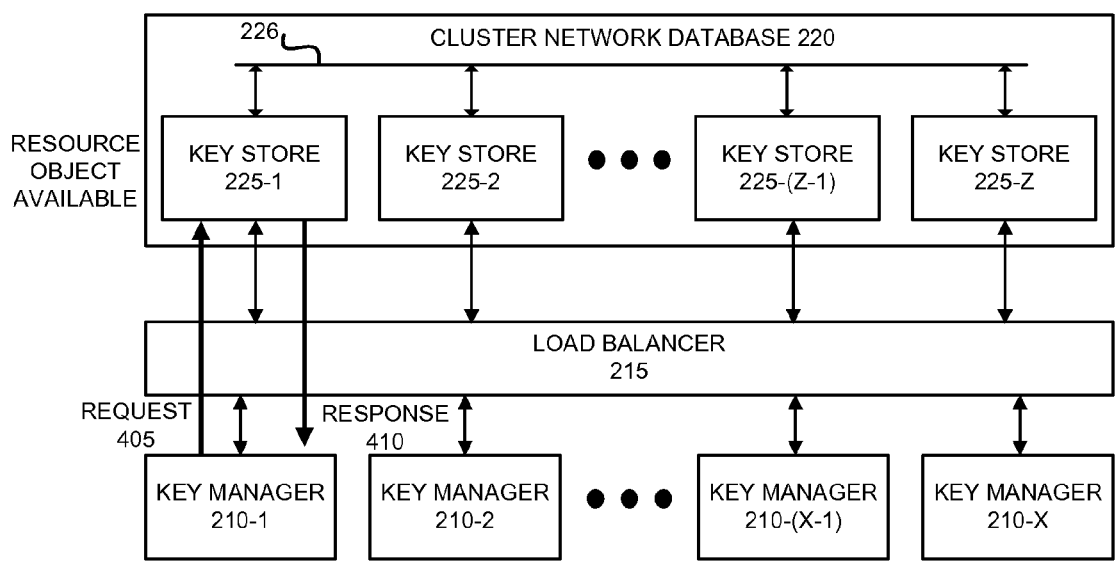
FIGS. 4A-4E are diagrams illustrating an exemplary process pertaining to an exemplary embodiment of the key service platform.

FIGS. 4A-4E are diagrams illustrating exemplary processes pertaining to an exemplary embodiment of the key service platform. Referring to FIG. 4A, key managers 210 may include scheduling logic that provides a scheduling service relative to the key service. For example, the scheduling logic may cause key managers 210 to perform certain tasks relative to key management according to a schedule. According to an exemplary embodiment, the scheduling logic causes key managers 210 to request the resource object and update any keys that are about to expire with respect to key stores 225. For example, as illustrated, key manager 210-1 generates a request 405 directed to key stores 225 via load balancer 215. That is, according to this scenario, key manager 210-1 may update any of the key stores 225. According to other examples, key manager 210-1 may be able to update only certain key stores 225 or perhaps even only key store 225. Key manager 210-1 transmits request 405 to load balancer 215. According to this example, in response to receiving request 405, load balancer 215 load balances request 405 among other traffic and transmits request 405 to key store 225-1. Key store 225-1 receives request 405 (e.g., a query) and in response generates and transmits a response 410.

Depending on the state of the resource object (e.g., available or not available), response 410 will grant or not grant permission to key manager 210-1 to update any keys that can be updated. For example, response 410 may carry the value indicating the state of the resource object. For example, when the state of the resource object is not available, key manager 210-1 may wait a back-off period before requesting the resource object again. Alternatively, when the state of the resource object is available, key manager 210-1 secures or obtains the resource object. As previously described, according to an exemplary implementation, the resource object has different values for indicating that it is available and not available. According to this exemplary scenario, assume that the resource object is available (e.g., its value being stored in resource object field 330), and response 410 grants permission to key manager 210-1 to generate a new key for any key that is about to expire. The resource object stored in key store 225-1 changes to a new value to indicate that the resource object is no longer available to other key managers 210.

Figure 4B:
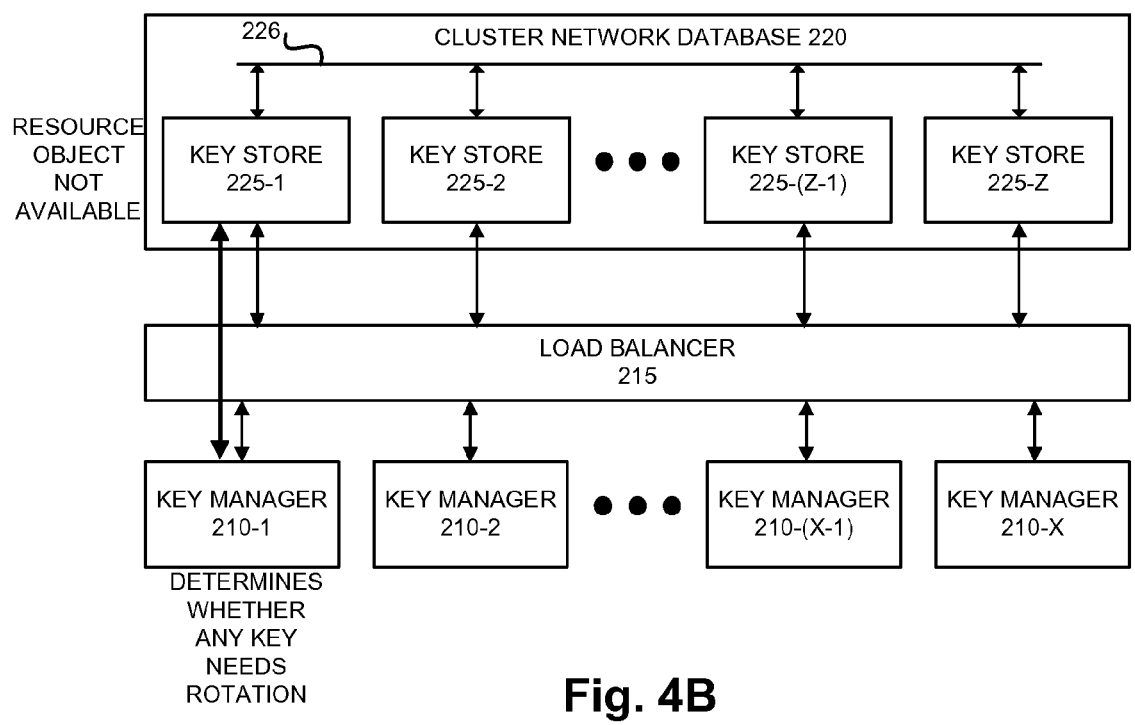

Referring to FIG. 4B, in response to be granted permission, key manager 210-1 determines whether any key is about to expire. For example, key manager 210-1 may read and/or query each key expiration field 325 relative to profiles 335. According to an exemplary implementation, key manager 210-1 may be assigned to manage a subset of profiles 335. According to another exemplary implementation, key manager 210-1 may be assigned to manage all profiles 335 of key store 225-1. Key manager 210-1 compares the date and the timestamp indicated by each key expiration field 325 of profile 335 to the current date and the current time. Based on a result of the comparison, key manager 210-1 determines whether a key should be rotated (i.e., a new key generated). For example, when the date and the timestamp stored in key expiration field 325 indicates a date and a timestamp equal to or subsequent to the current date and the current time, key manager 210-1 determines that a new key should be generated. However, when the date and the timestamp stored in key expiration field 325 indicates a date and a timestamp before the current date and the current time, key manager 210 determines that a new key should not be generated.

Figure 4C:
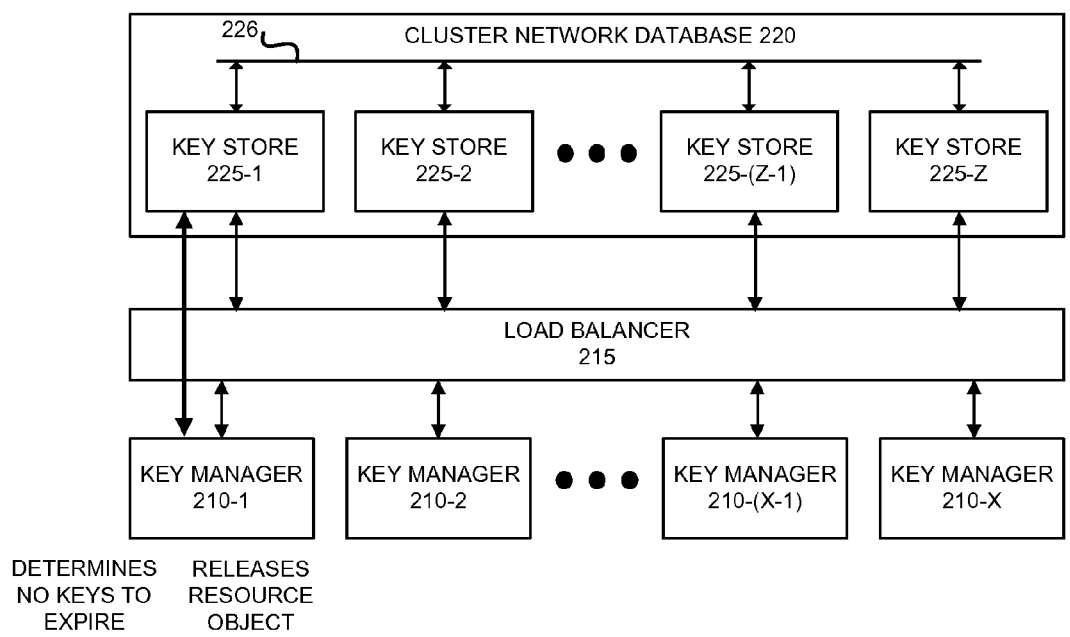
Figure 4D:
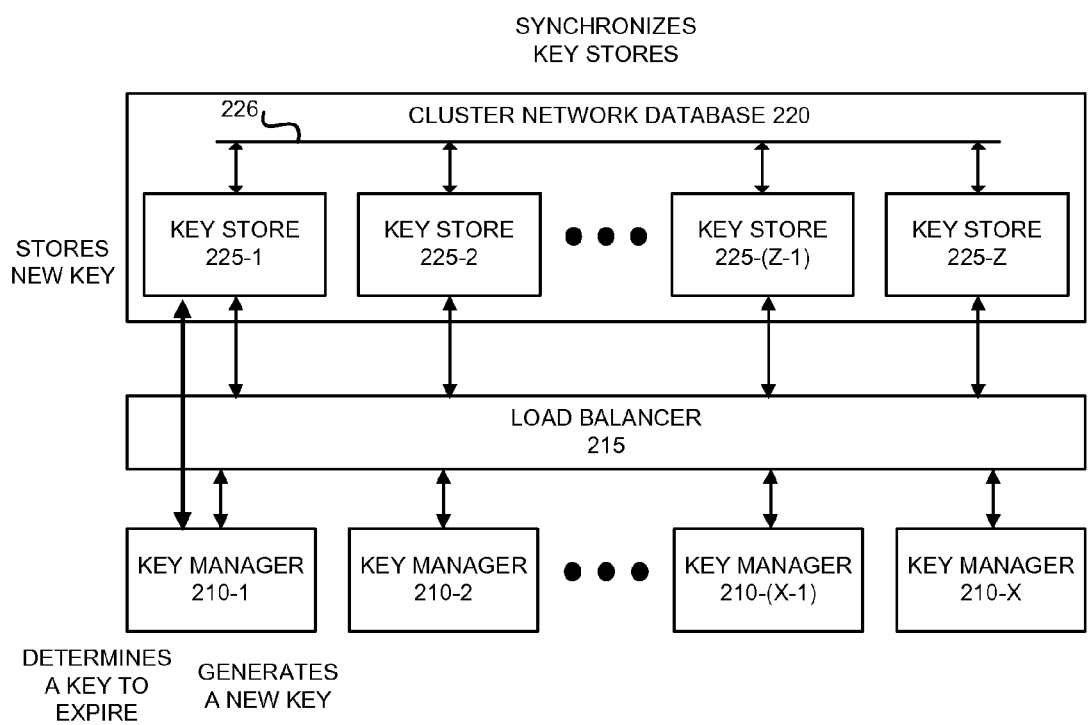

According to an exemplary embodiment, when each key expiration field 325 of profiles 335 does not indicate that any keys are about to expire, key manager 210-1 releases the resource object and waits for a next task according to the scheduling logic, as illustrated in FIG. 4C. However, when each key expiration field 325 of profiles 335 indicates that one or multiple keys are about to expire, key manager 210-1 generates one or multiple new keys pertaining to the one or multiple keys that are about to expire, as illustrated in FIG. 4D. Key manager 210-1 may use a randomizer to generate new key data. For example, key manager 210-1 may generate a new key identifier and a new key value. Key manager 210-1 stores the new key identifier in key identifier field 305 and stores the new key value in key value 310 of key store 225-1. Key manager 210-1 also generates and stores a new date and timestamp, which corresponds to when the new key was generated, in key creation field 320. Key manager 210-1 further generates and stores a new date and timestamp, which corresponds to when the new key is to expire, in key expiration field 325. Key manager 210-1 also deletes any keys that have expired (e.g., as a clean-up task) from key store 225-1.

Additionally, as further illustrated in FIG. 4D, in response to storing the newly generated key(s), cluster network database 220 causes other key stores 225 to synchronize with key store 225-1 so that this update to key store 225-1 is reflected among the other key stores 225. According to this exemplary scenario, assume that key manager 210-1 determines that at least one key is about to expire. Consequently, key manager 210-1 generates and stores the at least one key in key store 225-1.

Figure 4E:
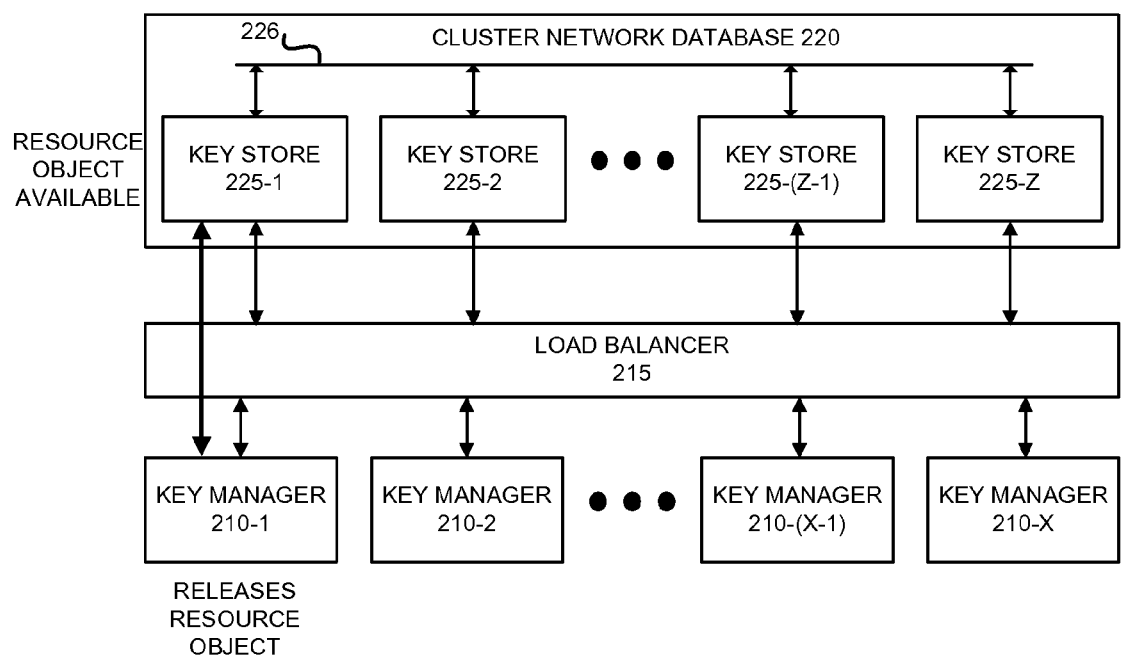

Referring to FIG. 4E, subsequent to storing the one or multiple keys in key store 225-1, key manager 210-1 releases the resource object. In response to release of the resource object, the value of the resource object reverts back to a value, which is stored in resource object field 330 of key store 225-1, to indicate that the resource object is available. At this instance, any key manager 210 may obtain the resource object in order to update key store 225-1. Key manager 210-1 waits for the next scheduled task.

Although FIGS. 4A-4E illustrate exemplary processes pertaining to the key service platform, according to other embodiments and/or scenarios, a process may include additional operations, fewer operations, and/or different operations than those illustrated and described. For example, according to another exemplary embodiment, key manager 210 may determine that although the key generation time policy does not permit key manager 210 to generate a new key, key manager 210 can determine to generate the new key. As an example, referring back to a previous example, assume the key generation time policy allows key manager 210 to generate a new key within a pre-defined time period (e.g., one day) before the expiration date and time. Key manager 210 monitors the amount of time to access key store 225 via load balancer 215 and perform the key service. By way of further example, key manager 210 may monitor the amount of time beginning from a time when request 405 is transmitted to a time when key expiration field 325 can be queried and/or read.

When the amount of time exceeds a threshold value, key manager 210 may analyze a time difference value between the current date and time and the key expiration data pertaining to the keys. When the time difference value is equal to or less than a time difference threshold value, key manager 210 holds the resource object for a sufficient time period in order for the date and the timestamp indicating an expiration of the key to transition to a date and time equal to the current time. Alternatively, key manager 210 holds the resource object for a sufficient time period to perform the key service task (e.g., generate and store the new key). However, when the time difference value is greater than the time difference threshold value, key manager 210 will generate new keys for any keys that have expired, store the new keys, and release the resource object.

As an example, assume for one of the keys, key expiration field 325 indicates two dates and two timestamps in which a first date and timestamp is an expiration date and timestamp (e.g., Nov. 15, 2015 at 11:15:20 p.m. (Eastern time)), and a second date and timestamp is a key generation date and timestamp (e.g., Nov. 14, 2015 at 11:15:20 p.m. (Eastern time)). Also, assume that the current time is Nov. 14, 2015 at 11:15:19 p.m. (Eastern Time) and that the time difference threshold value is set at one second. According to this example, key manager 210 holds the resource object and generates and stores the new key pertaining to this key.

Figure 5:
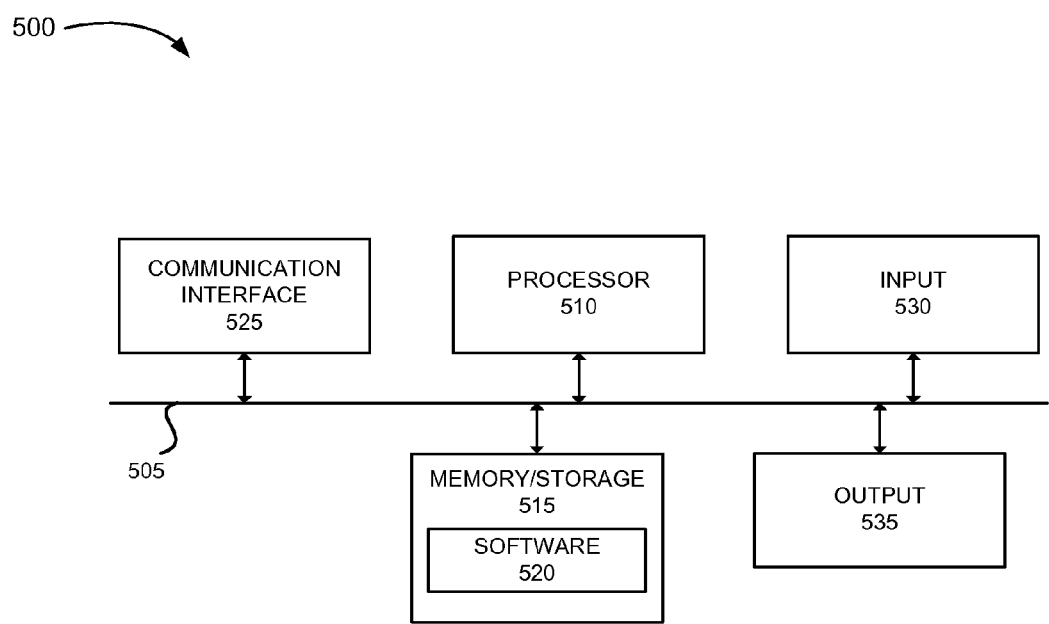
FIG. 5 is a diagram illustrating exemplary components of a device that may correspond to the devices depicted in the previous figures.

FIG. 5 is a diagram illustrating exemplary components of a device 500. Device 500 may correspond to each of the network elements and user device depicted in environment 100. As illustrated in FIG. 5, according to an exemplary embodiment, device 500 includes a bus 505, a processor 510, a memory/storage 515, which stores software 520, a communication interface 525, an input 530, and an output 535. According to other embodiments, device 500 may include fewer components, additional components, different components, and/or a different arrangement of components than those illustrated in FIG. 5 and described herein.

Bus 505 includes a path that permits communication among the components of device 500. For example, bus 505 may include a system bus, an address bus, a data bus, and/or a control bus. Bus 505 may also include bus drivers, bus arbiters, bus interfaces, and/or clocks.

Processor 510 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 510 may be implemented as hardware (e.g., a microprocessor, etc.), a combination of hardware and software (e.g., a SoC, an ASIC, etc.), may include one or multiple memories (e.g., cache, etc.), etc.

Processor 510 may control the overall operation or a portion of operation(s) performed by device 500. Processor 510 may perform one or multiple operations based on an operating system and/or various applications or computer programs (e.g., software 520). Processor 510 may access instructions from memory/storage 515, from other components of device 500, and/or from a source external to device 500 (e.g., a network, another device, etc.). Processor 510 may perform an operation and/or a process based on various techniques including, for example, multithreading, parallel processing, pipelining, interleaving, etc.

Memory/storage 515 includes one or multiple memories and/or one or multiple other types of storage mediums. For example, memory/storage 515 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory. Memory/storage 515 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 515 may include drives for reading from and writing to the storage medium.

Memory/storage 515 may be external to and/or removable from device 500, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray® disk (BD), etc.). Memory/storage 515 may store data, software, and/or instructions related to the operation of device 500.

Software 520 includes an application or a program that provides a function and/or a process. Software 520 is also intended to include firmware, middleware, microcode, hardware description language (HDL), and/or other form of instruction. By way of example, with respect to the key manager 210, key manager 210 may be implemented to include software 520 to provide the key service. Additionally, for example, cluster network database 220, key store 225, load balancers 205 and 215, and key agent 120 may be implemented to include software 520 to perform tasks as described herein.

Communication interface 525 permits device 500 to communicate with other devices, networks, systems, devices, and/or the like. Communication interface 525 includes one or multiple wireless interfaces and/or wired interfaces. For example, communication interface 525 may include one or multiple transmitters and receivers, or transceivers. Communication interface 525 may include an antenna. Communication interface 525 may operate according to a protocol stack and a communication standard. Communication interface 525 may include various processing logic or circuitry (e.g., multiplexing/de-multiplexing, filtering, amplifying, converting, error correction, etc.).

Input 530 permits an input into device 500. For example, input 530 may include a keyboard, a mouse, a display, a button, a switch, an input port, speech recognition logic, a biometric mechanism, a microphone, a visual and/or audio capturing device (e.g., a camera, etc.), and/or some other type of visual, auditory, tactile, etc., input component. Output 535 permits an output from device 500. For example, output 535 may include a speaker, a display, a light, an output port, and/or some other type of visual, auditory, tactile, etc., output component. According to some embodiments, input 530 and/or output 535 may be a device that is attachable to and removable from device 500.

Device 500 may perform a process and/or a function, as described herein, in response to processor 510 executing software 520 stored by memory/storage 515. By way of example, instructions may be read into memory/storage 515 from another memory/storage 515 (not shown) or read from another device (not shown) via communication interface 525. The instructions stored by memory/storage 515 cause processor 510 to perform a process described herein. Alternatively, for example, according to other implementations, device 500 performs a process described herein based on the execution of hardware (processor 510, etc.).

Figure 6:
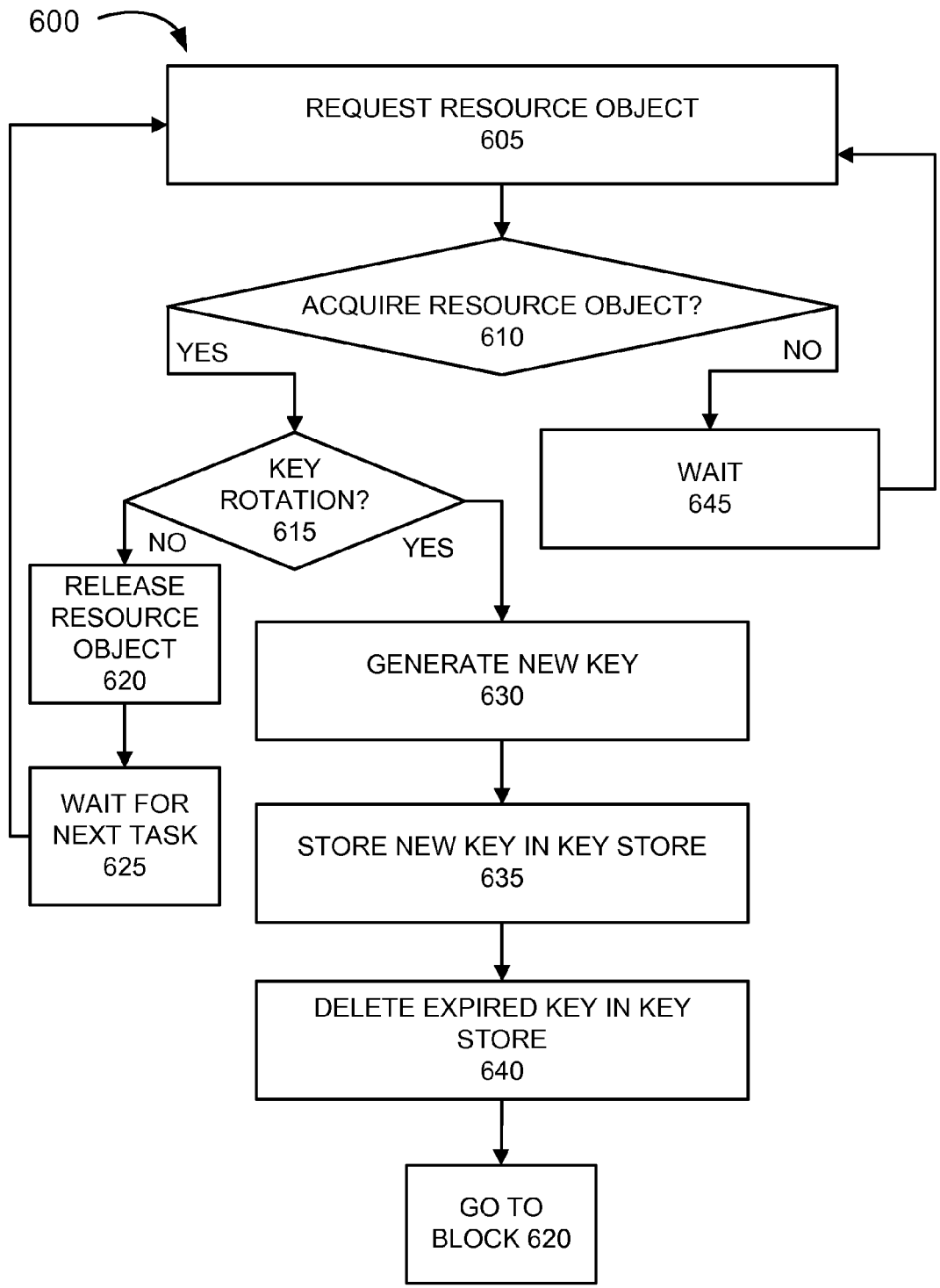
FIG. 6 is a flow diagram illustrating an exemplary process pertaining to an exemplary embodiment of a key service of the key service platform.

FIG. 6 is a flow diagram illustrating an exemplary process 600 pertaining to the key service of the key service platform. Process 600 is directed to processes previously described with respect to FIGS. 4A-4E, and elsewhere in this detailed description, in which key services of the key service platform are described. According to an exemplary embodiment, key manager 210 performs steps of process 600. For example, processor 510 executes software 520 to perform the steps described.

Referring to FIG. 6, in block 605, process 600 may begin with requesting a resource object. For example, key manager 210 may operate according to scheduling logic that causes key manager 210 to query key store 225 and determine whether any keys need updating. Key manager 210 may generate and transmit a request to key store 225 via load balancer 215.

In block 610, it is determined whether the resource object is acquired. For example, key manager 210 may receive a response to the request from key store 225. Depending on the state of the resource object, key manager 210 may determine whether the resource object is available to key manager 210. For example, the resource object stored in key store 225 may have one value when the resource object is available and another value when the resource object is not available.

When it is determined that the resource object is acquired (block 610—YES), then it is determined whether a key rotation is to be performed (block 615). For example, when the response indicates that key manager 210 has secured the resource object, key manager 210 may select, read, and/or query key data (e.g., key expiration data) stored in key store 225 that indicates when a key is to expire (e.g., an expiration date and timestamp) and/or when a new key can be generated (e.g., a key generation date and timestamp). When it is determined that a key rotation is to not be performed (block 615—NO), then the resource object is released (block 620). For example, when the key expiration data indicates a date and a time that is before the current time, key manager 210 determines that the key rotation is to not be performed. In response to such a determination, key manager 210 releases the resource object. In response to the release of the resource object, key store 225 and/or key manager 210 change(s) the value of the resource object to a value indicating that the resource object is available.

In block 625, a wait period is executed. For example, key manager 210 waits until a next task is to be performed. As an example, key manager 210 may wait for the next scheduled time to request the resource object so as to check whether any further keys need updating.

When it is determined that a key rotation is to be performed (block 615—YES), a new key is generated (block 630). For example, key manager 210 generates a new key. For example, key manager 210 may generate a new key identifier and a new key value based on a random algorithm. Key manager 210 also generates other key data (e.g., key creation data and key expiration data).

In block 635, the new key is stored in the key store. Key manager 210 stores the generated key in key store 225. For example, key manager 210 stores the new key identifier and the new key value in key store 225. Key manager 210 also stores key creation data and key expiration data in key store 225. In block 640, an expired key is deleted in the key store. Key manager 210 deletes an expired key stored in key store 225. Thereafter, process 600 continues to block 620, and the subsequent steps are performed, as previously described.

When it is determined that the resource object is not acquired (block 610—NO), then a wait period is executed (block 645). Key manager 210 waits a period of time before transmitting another request for the resource object, as described in block 605.

Although FIG. 6 illustrates an exemplary process pertaining to the key service of key service platform 110, according to other embodiments, process 600 may include additional operations, fewer operations, and/or different operations than those illustrated in FIG. 6, and as described herein.

Figure 7A:
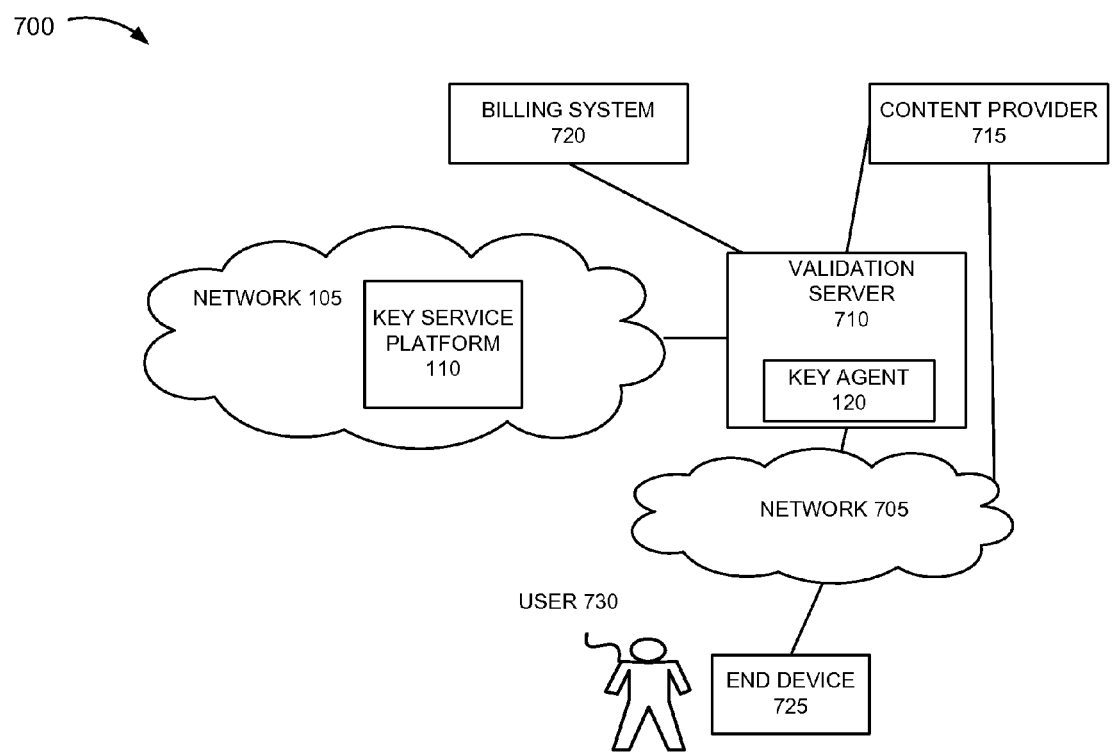
FIG. 7A is a diagram illustrating another exemplary environment in which an exemplary embodiment of the key service of the key service platform may be implemented.

FIG. 7A is a diagram illustrating an exemplary environment in which an exemplary embodiment of the key service of the key service platform may be implemented. As illustrated, environment 700 includes a network 705, a validation server 710 that includes key agent 120, a content provider 715, a billing system 720, an end device 725, and a user 730. Environment 700 also includes network 105 and key service platform 110. The links illustrated are exemplary. Additionally, the number of links and the arrangement of links are exemplary and may include an additional intermediary network and/or an intermediary network device not illustrated in FIG. 7A.

Network 705 includes one or multiple networks of one or multiple types. For example, network 705 may be implemented to include an access network, a core network, a packet-switched network, the Internet, a WAN, a MAN, a private network, a public network, and so forth. Network 705 provides end users (e.g., user 730) access to content provider 715.

Validation server 710 includes a network device that validates Uniform Resource Indicators (URIs) of a TFDS pertaining to sponsored data customers. For example, traffic from end users may be routed via validation server 710. Validation server 710 includes logic to identify and validate URIs of the TFDS pertaining to such traffic. When a URI is validated, validation server 710 uses a key provided by the key service of key service platform 110. Validation server 710 transmits the validation and authorization information to billing system 720 so that a sponsored data customer associated with the URI is billed for data used by the end user stemming from the traffic. Validation server 710 includes key agent 120. Key agent 120 communicates with key service platform 110 to ensure that validation server 710 is in possession of the most up-to-date key.

Content provider 715 includes a network device that provides an asset or a service. Content provider 715 may host a URI that is recognized by validation server 710 as a URI associated with the TFDS. That is, content provider 715 is associated with a sponsored data customer of the TFDS. Content provider 715 may transmit messages to validation server 710 when end users visit the URI associated with the TFDS. Billing system 720 includes a network device that generates billing information pertaining to customers' use of network resources (e.g., network 705, etc.). End device 725 includes a computational and communicative device that allows user 730 to communicate with content provider 715. For example, end device 725 may be implemented as a smartphone, a computer, and so forth. User 730 is an operator of end device 725.

Figure 7B:
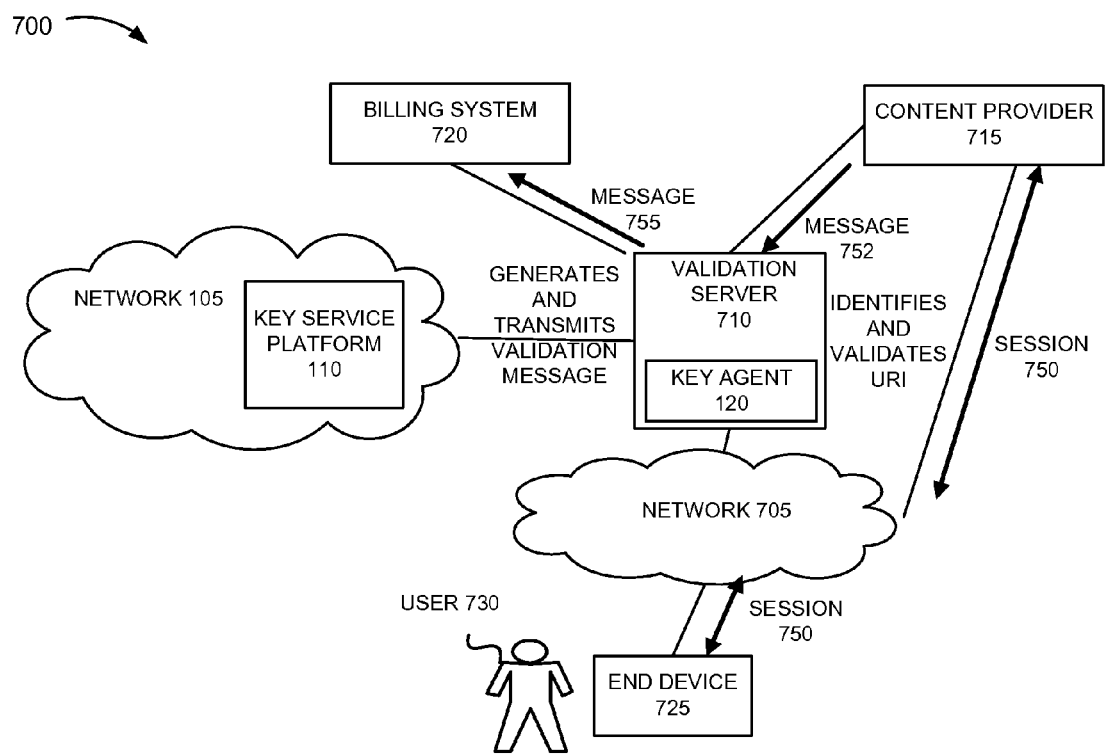
FIGS. 7B-7D are diagrams illustrating an exemplary process of the key service based on an exemplary scenario pertaining to a TFDS.
Figure 7C:
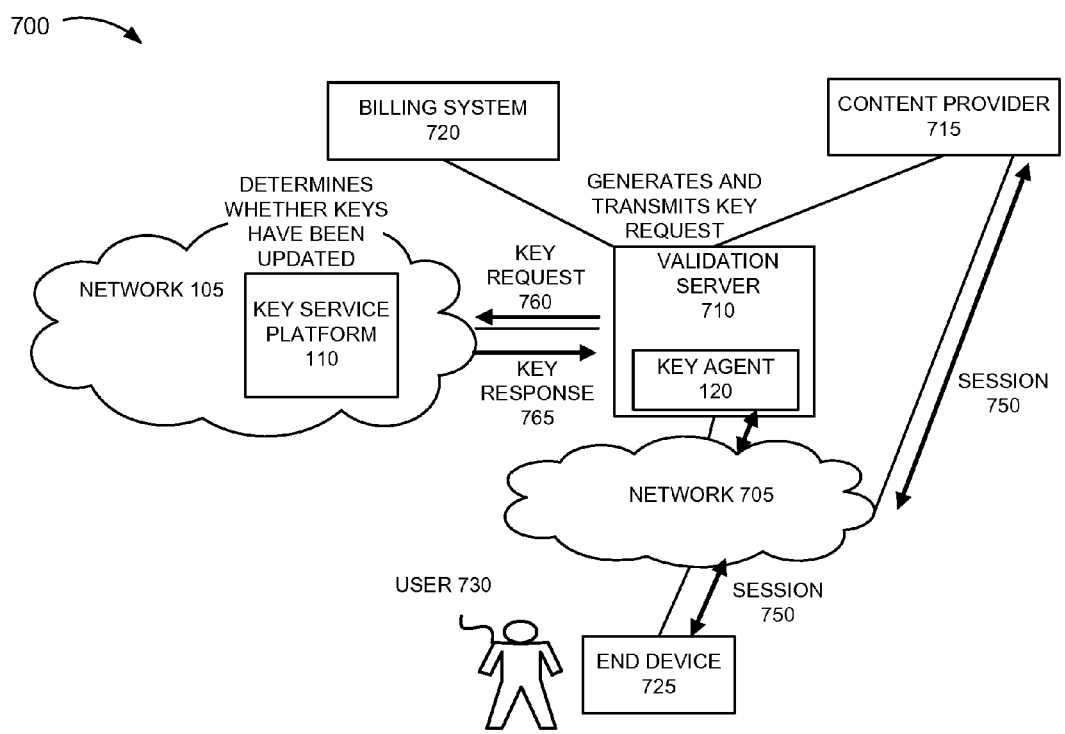
Figure 7D:
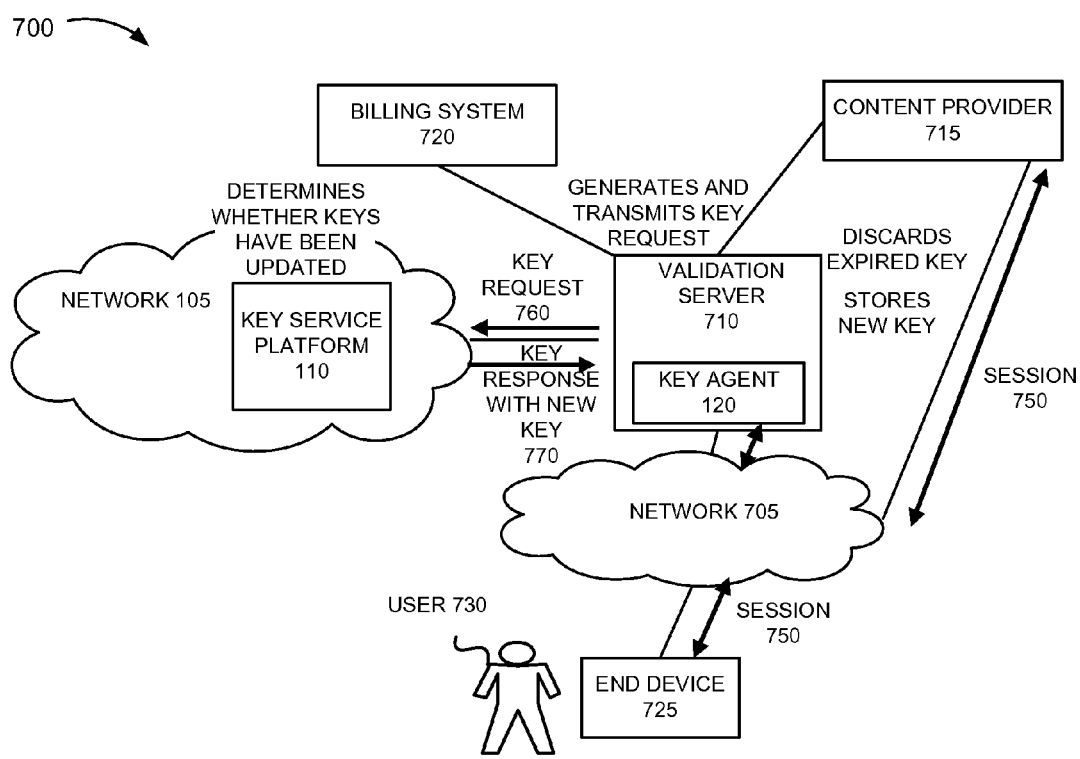

FIGS. 7B-7D are diagrams illustrating an exemplary process of the key service based on an exemplary scenario pertaining to a TFDS. Referring to FIG. 7B, assume user 730 begins a session 750 with content provider 715. As illustrated, by way of arrows, a communication coupling of session 750 traverses network 705 to content provider 715. When a session is established with a URI associated with the TFDS service, content provider 715 transmits a message 752. Message 752 includes data indicating the URI associated with the TFDS service. In response to receiving message 752, validation server 710 identifies and validates that the URI pertaining to session 750 is a URI associated with the TFDS. For example, validation server 710 may perform a lookup in a database or a data structure that stores URIs that have been registered by sponsored data customers as URIs that are a part of the TFDS. According to this example, assume that the URI pertaining to session 750 is a registered URI for the TFDS. In response to validating the URI, validation server 710 uses a key stored at validation server 710 to generate a message 755 that includes information pertaining to the validated URI. Validation server 710 transmits message 755 to billing system 720. Billing system 720 receives message 755 and will generate a bill directed to the content provider associated with content provider 715 stemming from the data used during session 750.

Referring to FIG. 7C, key agent 120 of validation server 710 is configured to request whether any updates to one or multiple keys stored at validation server 710 has/have been updated since a last key request was made to key service platform 110. According to an exemplary implementation, key agent 120 may be configured to generate and transmit a key request to key service platform 110 on a periodic basis or based on some other type of triggering event. According to such a configuration, as illustrated, key agent 120 generates and transmits a key request 760 to key service platform 110. In response to receiving key request 760, key manager 210 queries key store 225 to determine whether any key(s), which have been issued to validation server 710, have been updated according to the key service described herein, since a last key request from key agent 120 was received by key service platform 110. For example, key manager 210 may use key creation field 320 and other fields stored in key store table 300 to make such a determination. Additionally, for example, key manager 210 may store key agent information. The key agent information may include information pertaining to keys that have been issued to key agent 120 (e.g., key identifiers), key request information (e.g., timestamps), etc. Key manager 210 may use key agent information to determine whether a key(s) has been updated since a last key request. For example, key manager 210 may select one or multiple keys stored in cluster network database 220 to query based on the key agent information. Additionally, key manager 210 may compare key request information to key creation information.

When key manager 210 determines that no keys have been updated, key manager 210 generates and transmits a key response 765, which indicates no keys have been updated, to key agent 120. However, referring to FIG. 7D, when key manager 210 determines that a key has been updated, key manager 210 generates and transmits a key response 770, which carries the updated key(s), to key agent 120. In response to receiving key response 770, key agent 120 deletes the expired key(s) and stores the new key(s). Validation server 710 uses the new key(s) for all subsequent validation messages to billing system 720.

The foregoing description of embodiments provides illustration, but is not intended to be exhaustive or to limit the embodiments to the precise form disclosed. Accordingly, modifications to the embodiments described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The term "exemplary," as used herein means "serving as an example." Any embodiment or implementation described as "exemplary" is not necessarily to be construed as preferred or advantageous over other embodiments or implementations.

In addition, while a series of blocks has been described with regard to the process illustrated in FIG. 6, the order of the blocks may be modified according to other embodiments. Further, non-dependent blocks may be performed in parallel or simultaneously. For example, according to an exemplary implementation, two or more operations may be performed using parallel processing or a multitasking procedure. Additionally, other processes described in this description may be modified and/or non-dependent operations may be performed in parallel or simultaneously.

The embodiments described herein may be implemented in many different forms of software executed by hardware. For example, a process or a function may be implemented as "logic" or as a "component." The logic or the component may include, for example, hardware (e.g., processor 510), or a combination of hardware and software (e.g., software 520). The embodiments have been described without reference to the specific software code since the software code can be designed to implement the embodiments based on the description herein and commercially available software design environments/languages.

In the preceding specification, various embodiments have been described with reference to the accompanying drawings. However, various modifications and changes may be made thereto, and additional embodiments may be implemented, without departing from the broader scope of the invention as set forth in the claims that follow and various obvious modifications and equivalent arrangements. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

Additionally, embodiments described herein may be implemented as a non-transitory storage medium that stores data and/or information, such as instructions, program code, a computer program, software, a software application, a data structure, a program module, an application, machine code, a file that can be executed using an interpreter, etc. The program code, instructions, application, etc., is readable and executable by a processor (e.g., processor 510) of a computational device. A non-transitory storage medium includes one or more of the storage mediums described in relation to memory/storage 515.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction described in the present application should be construed as critical or essential to the embodiments described herein unless explicitly described as such.

What is claimed is:

1. A method comprising:
    generating, by a network device, a request to obtain a resource object stored in a clustered network database that stores keys;
    transmitting, by the network device, the request to the clustered network database;
    receiving, by the network device, a response to the request;
    determining, by the network device, based on a value of the resource object carried in the response, whether permission to update the keys is permitted, wherein a first value of the resource object grants permission to update the keys and a second value of the resource object does not grant permission to update the keys, wherein the first value and the second value are different;
    determining, by the network device, whether any of the keys expired in response to determining that the value of the resource object corresponds to the first value indicating that permission is granted to update the keys, and wherein other network devices that are configured to update the keys are prevented from updating the keys stored in the clustered network database while the network device is granted permission to update the keys;
    generating, by the network device, a new key for each key of the keys that expired, in response to determining that one or more of the keys expired;
    storing, by the network device, the new key for each key of the one or more of the keys at the clustered network database; and
    releasing, by the network device, the resource object back to the clustered network database.

2. The method of claim 1, wherein determining whether any of the keys expired comprises:
    selecting key expiration data, which is stored at the clustered network database, which indicates dates and timestamps that new keys can be generated;
    comparing the key expiration data to a current date and time based on the selecting; and
    determining whether the key expiration data is before, equal to, or subsequent to the current date and time based on the comparing.

3. The method of claim 1, further comprising:
    determining that permission to update the keys is not granted based on the value of the resource object, wherein the value of the resource object corresponds to the second value.

4. The method of claim 1, wherein the generating comprises:
    generating a new key identifier that uniquely identifies the new key;
    generating a new key value of the new key;
    generating key creation data that indicates when the new key is generated; and
    generating key expiration data.

5. The method of claim 4, wherein the network device and the other network devices operate independently from each other, and wherein storing the new key further comprises:

storing the new key identifier, the new key value, the key creation data, and the key expiration data for each of the one or more keys at the clustered network database.

6. The method of claim 1, wherein the clustered network database includes multiple key stores, and wherein the resource object is stored in each of the key stores.

7. The method of claim 1, further comprising:
storing the value of the resource object as the second value while the network device has permission to update the keys.

8. The method of claim 7, further comprising:
storing the value of the resource object as the first value in response to the releasing;
receiving a key request, from a validation server of a toll-free data service, that requests whether any key used by the validation server has been updated since a last key request was received from the validation server inquiring whether any key has been updated;
querying, by the network device, the network clustered database as to whether any new key has been generated in response to receiving the key request; and
transmitting, by the network device, a key response that includes the new key to the validation server, based on a result of the querying that the new key has been updated since the last key request.

9. A network device comprising:
a communication interface;
a memory, wherein the memory stores instructions; and
a processor, wherein the processor executes the instructions to:
generate a request to obtain a resource object stored in a clustered network database that stores keys;
transmit, via the communication interface, the request to the clustered network database;
receive, via the communication interface, a response to the request;
determine based on a value of the resource object carried in the response, whether permission to update the keys is permitted, wherein a first value of the resource object grants permission to update the keys and a second value of the resource object does not grant permission to update the keys, wherein the first value and the second value are different;
determine whether any of the keys expired in response to a determination that the value of the resource object corresponds to the first value indicating that permission is granted to update the keys, and wherein other network devices that are configured to update the keys are prevented from updating the keys stored in the clustered network database while the network device is granted permission to update the keys;
generate a new key for each key of the keys that expired, in response to determining that one or more of the keys expired;
store the new key for each key of the one or more of the keys at the clustered network database; and
release the resource object back to the clustered network database.

10. The network device of claim 9, wherein when making the determination of whether any of the keys expired, the processor further executes the instructions to:
select key expiration data, which is stored at the clustered network database, that indicates dates and timestamps that new keys can be generated;
compare the key expiration data to a current date and time based on a selection; and
determine whether the key expiration data is before, equal to, or subsequent to the current date and time based on a result of a comparison.

11. The network device of claim 9, the processor further executes the instructions to:
determine that permission to update the keys is not granted based on the value of the resource object, wherein the value of the resource object corresponds to the second value.

12. The network device of claim 9, wherein when generating the new key, the processor further executes the instructions to:
generate a new key identifier that uniquely identifies the new key;
generate a new key value of the new key;
generate key creation data that indicates when the new key is generated; and
generate key expiration data that indicates when the new key is to expire.

13. The network device of claim 12, wherein when generating the new key identifier and the new key value, the processor further executes the instructions to:
generate the new key identifier and the new key value based on a random algorithm.

14. The network device of claim 12, wherein when storing the new key, the processor further executes the instructions to:
store the new key identifier, the new key value, the key creation data and the key expiration data for each of the one or more keys at the clustered network database, and wherein the processor further executes the instructions to:
receive, via the communication interface, a key request, from a validation server of a toll-free data service, that requests whether any key used by the validation server has been updated since a last key request was received from the validation server inquiring whether any key has been updated;
query the network clustered database as to whether any new key has been generated in response to a receipt of the key request; and
transmit, via the communication interface, a key response that includes the new key to the validation server, based on a result of a query that the new key has been updated since the last key request.

15. The network device of claim 12, wherein when generating the key expiration data, the processor further executes the instructions to:
generate a first date and a first timestamp indicating an expiration for each of the keys; and
generate a second date and a second timestamp indicating when a subsequent new key can be generated for each of the keys, wherein the first date and the first timestamp indicates a time subsequent to the second date and the second timestamp.

16. A non-transitory, computer-readable storage medium storing instructions executable by a processor of a computational device, which when executed cause the computational device to:
generate a request to obtain a resource object stored in a clustered network database that stores keys;
transmit the request to the clustered network database;
receive a response to the request;
determine based on a value of the resource object stored carried in the response, whether permission to update the keys is permitted, wherein a first value of the resource object grants permission to update the keys and a second value of the resource object does not grant permission to update the keys, wherein the first value and the second value are different;

determine whether any of the keys expired in response to a determination that the value of the resource object corresponds to the first value indicating that permission is granted to update the keys, and wherein other network devices that are configured to update the keys are prevented from updating the keys stored in the clustered network database while the network device is granted permission to update the keys;

generate a new key for each key of the keys that expired, in response to determining that one or more of the keys expired;

store the new key for each key of the one or more of the keys at the clustered network database; and release the resource object back to the clustered network database.

17. The non-transitory, computer-readable storage medium of claim 16, wherein the instructions to generate the new key further comprise instructions to:

generate a new key identifier that uniquely identifies the new key;

generate a new key value of the new key;

generate key creation data that indicates when the new key is generated; and generate key expiration data that indicates when the new key is to expire.

18. The non-transitory, computer-readable storage medium of claim 16, wherein the instructions to determine whether any of the keys expired further comprise instructions to:

select key expiration data pertaining to the keys;

compare the key expiration data to a current date and time; and determine whether the key expiration data is before, equal to, or subsequent to the current date and time based on a result of a comparison.

19. The non-transitory, computer-readable storage medium of claim 18, wherein the key expiration data includes a first date and a first timestamp that indicates an expiration for each of the keys, and a second date and a second timestamp that indicates when a new key can be generated, wherein the first date and the first timestamp indicate a time subsequent to the second date and the second timestamp.

20. The non-transitory, computer-readable storage medium of claim 19, wherein the instructions further comprise instructions to:

monitor a time period to access the clustered network database;

compare the time period to a threshold value;

determine whether the time period exceeds the threshold value as a result of a comparison between the time period and the threshold value, wherein when the time period does not exceed the threshold value, the instructions to determine whether any of the keys expired further comprises instructions to:

determine that the current date and time is before the second date and the second timestamp for at least one of the one or more of the keys;

calculate a time difference between the current date and time and the second date and the second timestamp;

determine whether the time difference is below a time difference threshold value; and wherein the instructions to generate the new key further comprise instructions to:

generate the new key for the at least one of the one or more keys in response to a determination that the time difference is below the time difference threshold value.

* * * * *